US007245710B1

(12) United States Patent
Hughes

(10) Patent No.: US 7,245,710 B1
(45) Date of Patent: Jul. 17, 2007

(54) TELECONFERENCING SYSTEM

(75) Inventor: Peter James Hughes, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,977

(22) PCT Filed: Apr. 7, 1999

(86) PCT No.: PCT/GB99/01061

§ 371 (c)(1),
(2), (4) Date: Sep. 11, 2000

(87) PCT Pub. No.: WO99/53673

PCT Pub. Date: Oct. 21, 1999

(30) Foreign Application Priority Data

Apr. 8, 1998 (GB) .................................. 9807745.6
Aug. 4, 1998 (EP) .................................. 98302763

(51) Int. Cl.
*H04M 3/42* (2006.01)
(52) U.S. Cl. ............................ 379/202.01; 379/93.21; 379/387.01
(58) Field of Classification Search ........... 379/202.01, 379/203.01, 204.01, 205.01, 206.01, 207.01, 379/158, 93.21, 387.01; 709/204; 370/260–270
See application file for complete search history.

(56) References Cited

U.S. PATENT DOCUMENTS 3,825,692 A    7/1974  Güeldenpfennig et al.
4,734,934 A *  3/1988  Boggs et al. ........... 379/202.01
5,020,098 A *  5/1991  Celli ..................... 379/202.01
5,307,415 A    4/1994  Fosgate
5,491,743 A *  2/1996  Shiio et al. ............ 379/202.01
5,533,129 A    7/1996  Gefvert
5,596,644 A *  1/1997  Abel et al. ..................... 381/17
5,617,539 A *  4/1997  Ludwig et al. .............. 709/205
5,802,180 A *  9/1998  Abel et al. ..................... 381/17
5,953,049 A *  9/1999  Horn et al. ............... 379/93.21
6,125,115 A *  9/2000  Smits ......................... 370/389
6,134,223 A * 10/2000  Burke et al. ............ 379/202.01
6,327,567 B1* 12/2001  Willehadson et al. ....... 704/270
7,012,630 B2*  3/2006  Curry et al. ........... 379/202.01
2003/0081115 A1* 5/2003  Curry et al. ............. 348/14.12

FOREIGN PATENT DOCUMENTS

EP    0 291 470 A2   11/1988
EP    0 561 133 A1    9/1993
EP    0 766 446 A2    4/1997

* cited by examiner

*Primary Examiner*—Ovidio Escalante
(74) *Attorney, Agent, or Firm*—Nixon & Vanderhye P.C.

(57) ABSTRACT

A teleconferencing system comprises a conference bridge having a multichannel connection to each customer equipment. The customer equipment has a unit to separately process each channel to provide one output representing each of the other participants. These outputs can be combined in a spatializer to provide a spatialized output in which each participant is represented by a virtual sound source. The conference bridge comprises a concentrator, having a unit to identify the currently active input channels and to transmit only those active channels over the multichannel connection, together with control information identifying the transmitted channels.

8 Claims, 11 Drawing Sheets

TELECONFERENCING SYSTEM

BACKGROUND

This invention relates to audio teleconferencing systems. These are systems in which three or more participants, each having a telephone connection, can participate in a multiway discussion. The essential part of a teleconference system is called the conference "bridge", and is where the audio signals from all the participants are combined. Conference bridges presently function by receiving audio from each of the participants, appropriately mixing the audio signals, and then distributing the mixed signal to each of the participants. All signal processing is concentrated in the bridge, and the result is monaural (that is, there is a single sound channel). This arrangement is shown in FIG. 1, which will be described in detail later. The principal drawback with such systems is that the audio quality is monophonic, generally poor, and it is very difficult to determine which participants are speaking at any one time, especially when the number of participants is large.

An example is given in European Patent Specification 0291470. This discloses an arrangement in which some of the input symbols are inverted in phase before combining them in the return channel thus allowing the cancellation, for each user, of his own voice.

BRIEF DESCRIPTION OF THE INVENTION

According to the invention, there is provided a teleconferencing system comprising a conference bridge having a multichannel connection to each of a plurality of terminal equipments, and at least one terminal equipment having means to separately process each channel to provide a plurality of outputs, each output representing one of the other terminal equipments. By adopting this multichannel approach, the conference environment can be tailored to the operating needs and circumstances of each individual by participants themselves.

Preferably the conference bridge comprises a concentrator, having means to identify the currently active input channels and to transmit only those active channels over the multichannel connection, together with control information identifying the transmitted channels. This reduces the capacity required by the multichannel connection. The control information identifying the active channels may be carried in a separate control channel, or as an overhead on the active subset of channels. In a preferred arrangement the channel representing a given terminal is excluded from the output provided to that terminal. This may be achieved by excluding that channel from the processing in the terminal equipment, but is preferably achieved by excluding it from the multichannel transmission from the bridge to that participant, thereby reducing further the capacity required by the multichannel connection.

BRIEF DESCRIPTION OF THE DRAWINGS

Exemplary embodiments of the invention will now be described, by way of example, with reference to the drawings, in which.

DETAILED DESCRIPTION OF EXEMPLARY EMBODIMENTS

Figure 1:
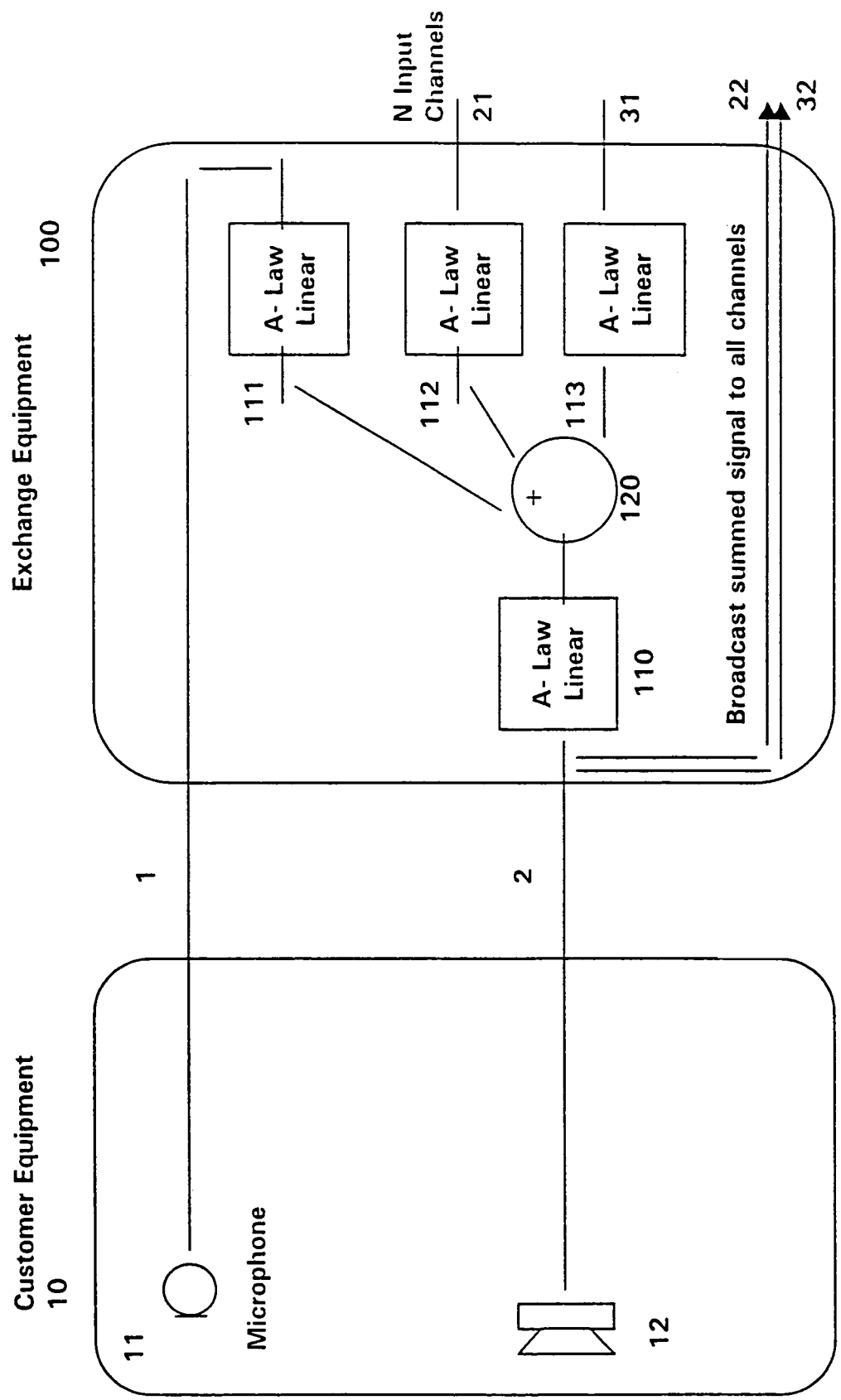
FIG. 1 illustrates a conventional teleconference system.

In the conventional system illustrated in FIG. 1 the conference bridge located in the exchange equipment 100 receives signals from the various customers' terminal equipments 10, (20, 30 not shown) in response to sounds detected by respective microphones 11, 21, 31 etc. These signals are transmitted over the telephone network (1), to the exchange 100 at which the bridge is established. Generally the signals will travel by way of a local exchange (not shown) in which the analogue signals are converted to digital form, usually employing linear combining such as "A law" (as used for example in Europe) or "mu-law" (as used for example in the United States of America) for onward transmission to the bridge exchange 100. On arrival at the bridge exchange 100, the bridge passes each incoming signal 11, 21, 31 through a respective digital converter 111, 112, 113 to convert them from A Law to linear digital signals, and then passes the linear signals to a digital combiner 120 to generate a combined signal. This combined signal is re-converted to A law in a further digital converter 110, and the resulting signal transmitted over the telephone network (2) to each terminal equipment 10, (20, 30) for conversion to sound in respective loudspeakers 12, 22, 32 etc. In this way the exchange equipment 100 acts as a "bridge" to allow one or more terminal equipments 30 to connect into a simple two-way connection between terminal equipments 10, 20.

The systems illustrated in FIGS. 2 to 8 replace the conventional conference bridge system of FIG. 1 with a multicast system in which several channels can be transmitted to each participant, using a multi-channel link comprising an uplink 3, and also a downlink which comprises a control channel 4 and a digital audio downlink 5. The audio downlink comprises several channels 51, 52. Participants with suitable terminal equipment can then process these channels 51, 52 in various ways as will be described.

The transmission medium used for the uplink 3 and downlink 4,5 can be any suitable medium. ISDN (Integrated Services Data Network) technology or LAN (Local Area Network)—respectively public and private data networks—are the favoured transmission options since they provide adequate data rate and low latency—delays due to coding and transmission buffering. However, they are expensive and to date they have a low penetration in the market place. Internet Protocol (IP) techniques are becoming widely used, but currently suffer from poor latency and unreliable data rates. However, over the next few years rapid improvements are envisaged in this technology and it is likely to become the preferred telecommunication method. Such systems would be ideally suited to implementing this invention. The latest internet type modems provide 56 kbit/s downstream (links 4, 5), and up to 28.8 kbit/s upstream (link 3). They are low cost and are commonly included in personal computer retail packages. Ideally a system should be able to work with all of the above, and also with standard analogue PSTN for use as backup.

Figure 2:
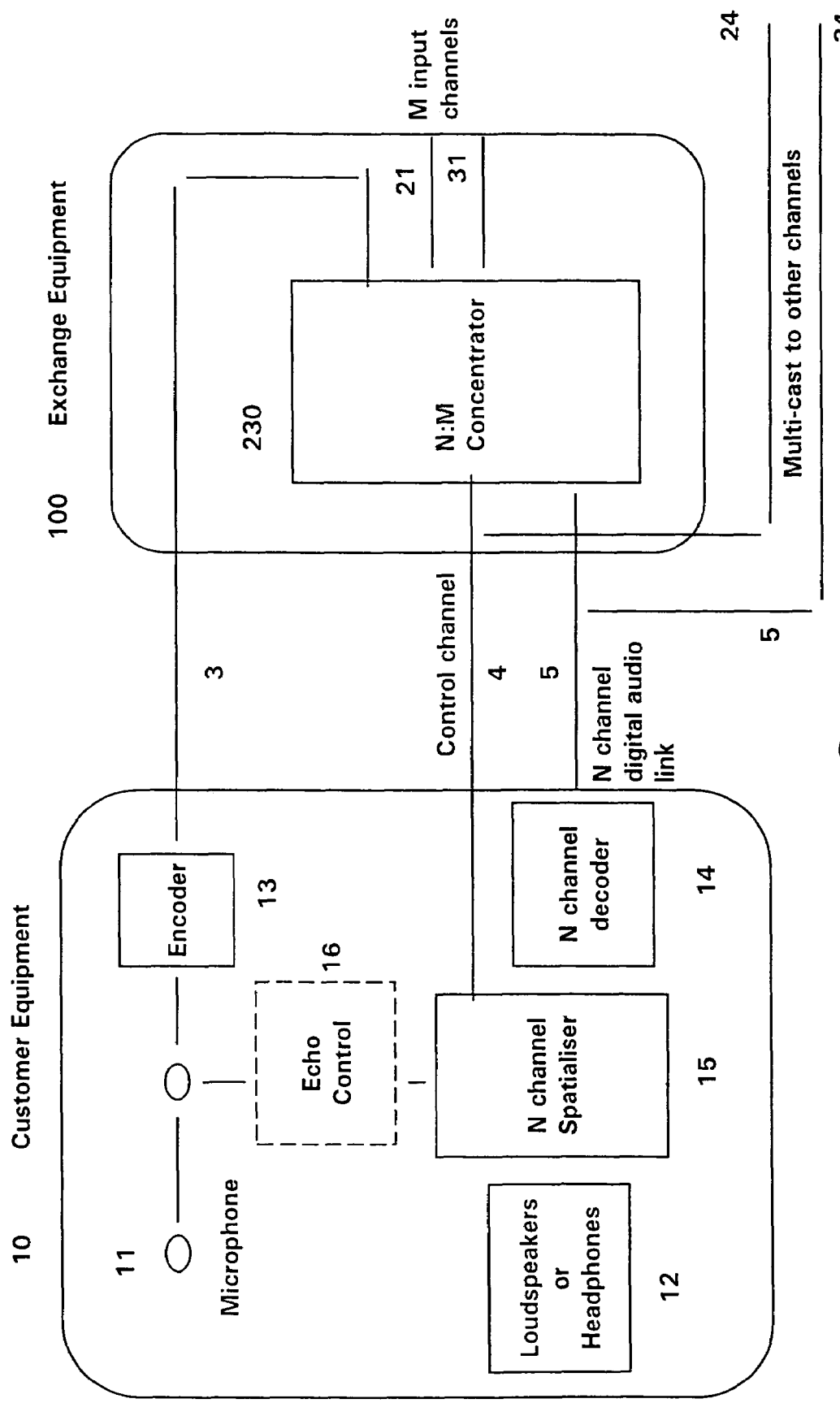
FIG. 2 illustrates a spatial audio teleconference system according to one embodiment of the invention.

In FIG. 2 the terminal equipment 10 contains a microphone 11 and loudspeaker system 12 as before. However, the loudspeaker system 12 is a spatialised system—that is, it has two or more channels to allow sounds to appear to emanate from different directions. This may take the form of stereophonic headphones, or a more complex system such as disclosed in U.S. Pat. No. 5,533,129 (Gefvert), U.S. Pat. No. 5,307,415 (Fosgate), article "Spatial Sound for Telepresence" by M. Holiier, D. Burraston, and A. Rimell in the British Telecom Technology Journal, October 1997 or the present applicant's own International Patent Application WO98/58523, published on 23 Dec. 1998.

The output from the microphone 11 is encoded by an encoder 13 forming part of the terminal equipment 10, and transmitted over the uplink 3 to the exchange equipment 100. Here it is combined with the other input channels 21, 31 from the other participants, terminals into a concentrator 230 which combines the various inputs into an audio signal having a smaller number of channels 51, 52 etc. These channels are transmitted over multiple-channel digital audio links 5 to the customer equipments 10, (20, 30) where they are first decoded by respective decoders 14, 24, 34 (FIG. 3) and provided to a spatialiser 15 (FIG. 4) for controlling the mixing of the channels to generate a spatialised signal in the speaker equipment 12.

The concentrator 230 selects from the input channels 11, 21, 31 those carrying useful information—typically those carrying speech—and passes only these channels over the return link 5. This reduces the amount of information to be carried. A control channel 4 carries data identifying which channels were selected. In the terminal equipment the spatialiser 15 uses data from the control channel to identify which of the original sound channels 11, 21, 31 it is receiving, and on which of the "N" channels 51, 52 in the audio link each original channel is present, and constructs a spatialised signal using that information. The spatialised signal can be tailored to the individual customer, for example the number of talkers in the spatialised system, the customer's preferences as to where in the spatialised system each participant is to seem to be located, and which channels to include.

In particular, the user may exclude the channel representing his own input 11, or may select a simultaneous translation instead of the original talker.

Figure 8:
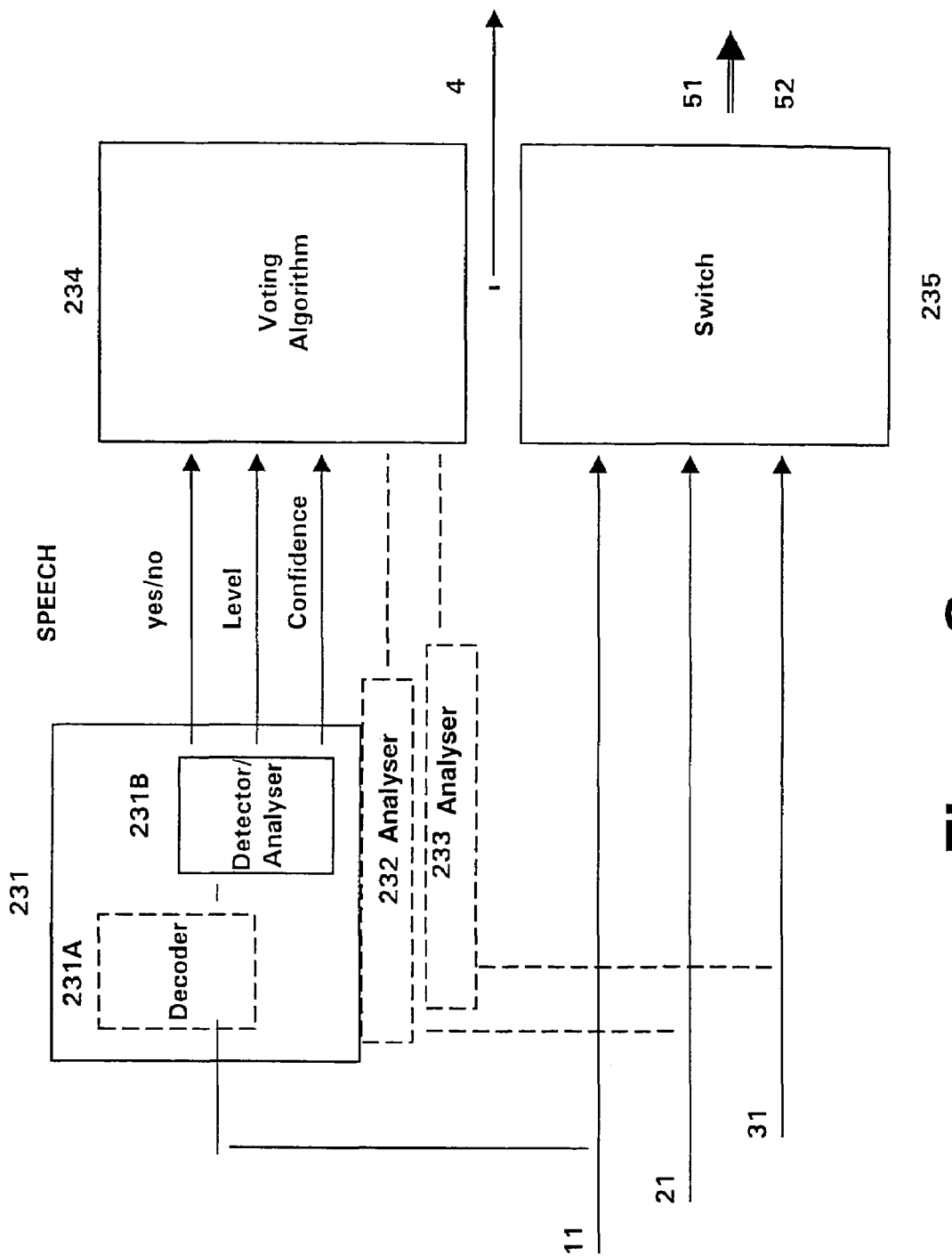
FIG. 8 illustrates a voice switched concentrator which may be used in the embodiments of the invention.

Transmission efficiency is achieved because only the active subset N of the total number of channels M are transmitted at any one time. The subset is chosen using a voice controlled dynamic channel allocation algorithm in the N:M concentrator 230. A possible implementation of this is shown in FIG. 8. Each input channel 11,21,31 is monitored by a respective analyser 231, 232, 233. As shown for analyser 231, the signal is subjected to a speech detection and analysis process 231b. This detects whether speech is present on the respective input 11, and gives a confidence value, indicative of how likely it is that the signal contains speech. This ensures that low-level background speech is given a lower weight than speech clearly addressed to the microphones 11, 21, 31 etc. A value is also given for level, to ensure speech directed to the microphone is preferred over background noise, and the level information can be passed to the spatialistion system to select a coding algorithm appropriate to the information in the speech. In order to detect and process the speech in the signals they first need to be decoded in a decoder 231a (this may be dispensed with if the speech detection system 231b can operate with digitally encoded signals).

A voting algorithm 234 then selects which of the inputs 11, 21, 31 have the clearest speech signals and controls a switch to direct each of the input channels 11, 21, 31 which have been selected to a respective one of the output channels 51, 52. Similar algorithms are used in Digital Circuit Multiplication Equipment (DCME) systems in international telephony circuits. Data relating the audio channels' content to the conference participants, and therefore the correspondence between the input channels 11, 21, 31 and output channels 51, 52 is transmitted over the control channel 4. Alternatively, this data can be embedded in the encoded audio data.

When there are fewer talkers identified than there are available output channels 51, 52, signal quality can be improved by using a less compressed digitisation scheme for those input channels selected, thereby using more than one output channel 51, 52 for each input channel selected. Telephone quality speech may be achieved at 8 kbits/s, allowing eight talkers to be accommodated if the system has a 64 kbit/sec capability. Should fewer talkers be detected, the 64 kbit/s capability may be used instead to provide four 16 kbit/s audio channels, capable of carrying 'good' quality speech, or a mixture of channels at different bit rates, to allow the coding rates to be selected according to the initial signal quality, or so that the main talker may be passed at higher quality than the other talkers.

Layered coding schemes can be used to allow graceful switching between data rates.

Figure 3:
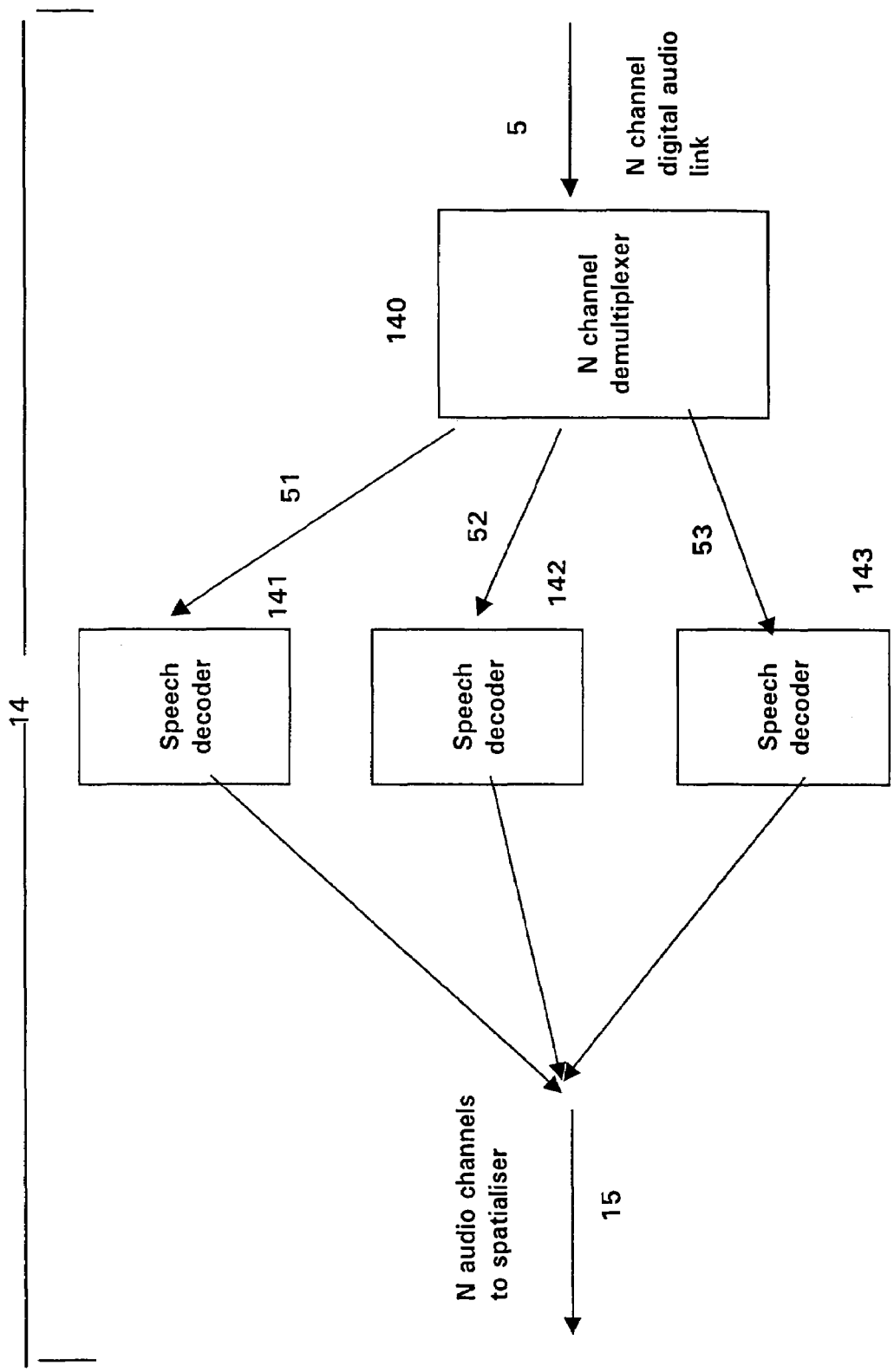
FIG. 3 illustrates a N-channel speech decoder used in the embodiment of FIG. 2.

The N-channel de-multiplexer and speech decoder 14 used in the terminal equipment 10 is shown in FIG. 3. This receives the channels 51, 52, 53 etc carried in the audio downlink 5 and separates them in a demultiplexer 140. Each channel 51, 52, etc is then separately decoded in a respective decoder 141, 142, 143, etc for processing by the spatialiser 15. The decoders 141, 142, etc may operate according to different processes according to the individual coding algorithms used, under the control of the control signals carried in the control channel 4.

A composite signal consisting of the summation of all input signals could also be transmitted. Such a signal could be used by users having monaural receiving equipment, and may also be used by the spatialiser to generate an ambient background signal. Alternatively the spatialiser 15 may replace any of the channels 11, 21, 31 not selected by the concentrator 230, and therefore not represented in the N channel link 5, by "comfort noise"; that is low-level white noise, to avoid the aural impression of a void which would be occasioned by a complete absence of signal.

The customer equipment 10 can be implemented using a desktop PC. Readily available PC sound card technology can provide the audio interface and processing needed for the simpler spatialising schemes. The more advanced sound cards with built in DSP technology could be used for more advanced schemes. The spatialiser 15 can use any one of a number of established techniques for creating an artificial audio environment as detailed in the Hollier et al article already referred to.

Spatialisation techniques may be summarised as follows. Any of these spatialisation techniques may be used with the present invention.

The simplest technique is "panning", where each signal is replayed with appropriate weighting via two or more loudspeakers such that it is perceived as emanating from the required direction. This is easy to implement, robust and may also be used with headphones.

"Ambisonic" systems are more complicated and employ a technique known as wavefront reconstruction to provide a realistic spatial audio percept. They can create very good spatial sound, but only for a very small listening area and are thus only appropriate for single listeners.

For headphone listening, "binaural" techniques can be used to provide very good spatialisaton. These use head-related transfer function (HRTF) filter pairs to recreate the soundfield that would have been present at the entrance to the ear canal for a sound emanating from any position in 3D space. This can give very good spatialisation and may be extended for use with loudspeakers, when it is known as "transaural". As with ambisonic systems, the correct listening region is very small.

Figure 4:
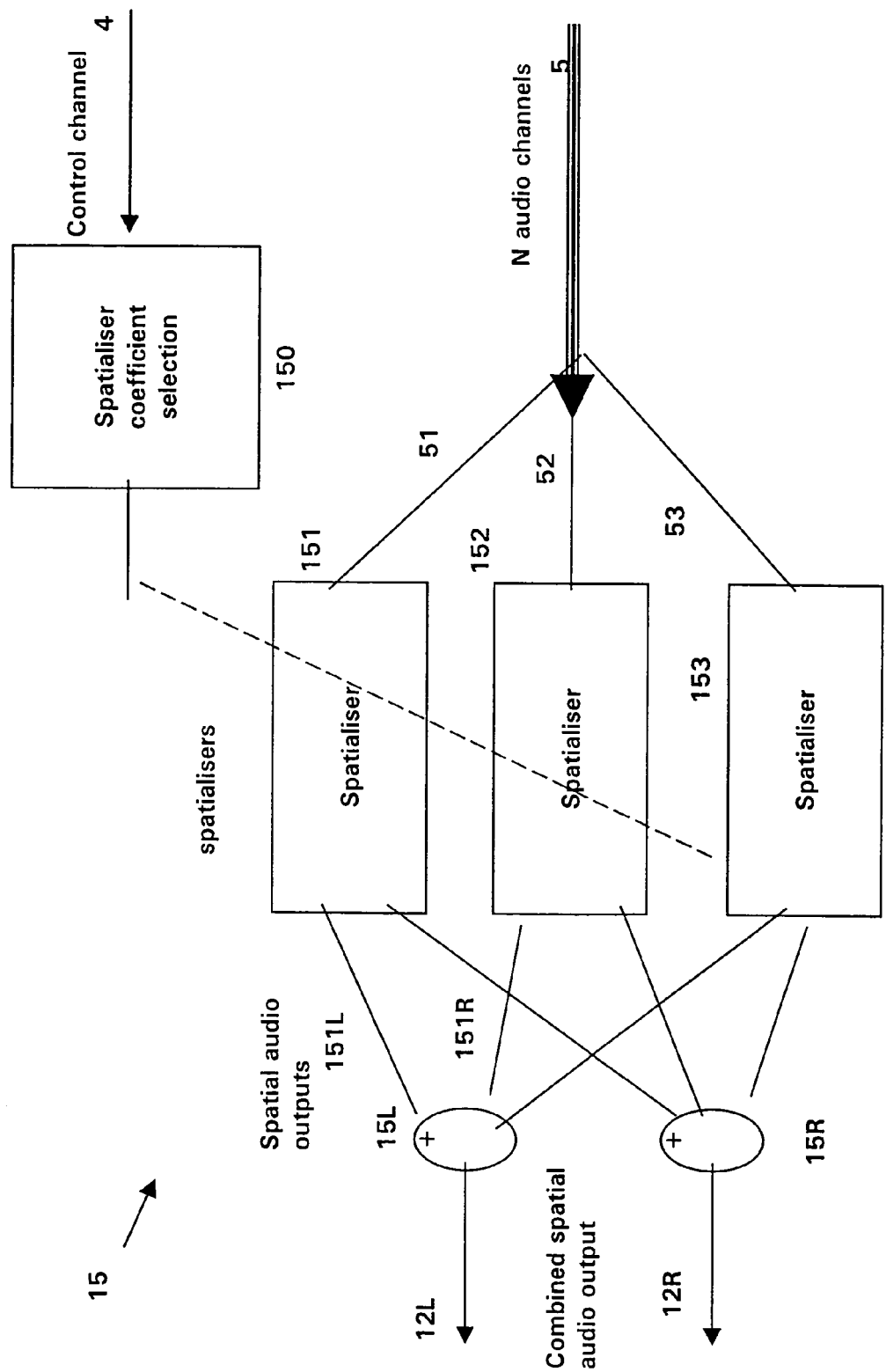
FIG. 4 illustrates a N-channel audio spatialiser used in the embodiment of FIG. 2.

The output of several spatialisers may be combined as shown in FIG. 4, which shows a spatialiser group for a stereophonic output having left and right channels 12L, 12R. Each channel 51, 52, 53 is fed to a respective spatialiser 151, 152, 153 which, under the control of a coefficient selector 150 control by the signals in the control channel 4, transmits an output 151L, 151R etc to each of a series of combiners 15L, 15R. The processing used to create the outputs 151L, 151R etc is operated under the control of the control signal 4 such that each channel appears as a virtual sound source, having its own location in the space around the listener.

The positions of virtual sources in three dimensional space could be determined automatically, or by manual control, with the user selecting the preferred positioning for each virtual sound source. For a video conference the positioning can be set to correspond with the appropriate video picture window. The video images may be sent by other means, or may be static images retrieved from local storage by the individual user.

If the spatialised sound is relayed via loudspeakers 12, rather than headphones, it will be necessary to prevent signals from the loudspeakers 12 being picked up by the microphone 11, re-transmitted and being heard as an echo at the distant sites 20, 30 etc. A technique for achieving this will be described later, with reference to FIG. 11.

Figure 5:
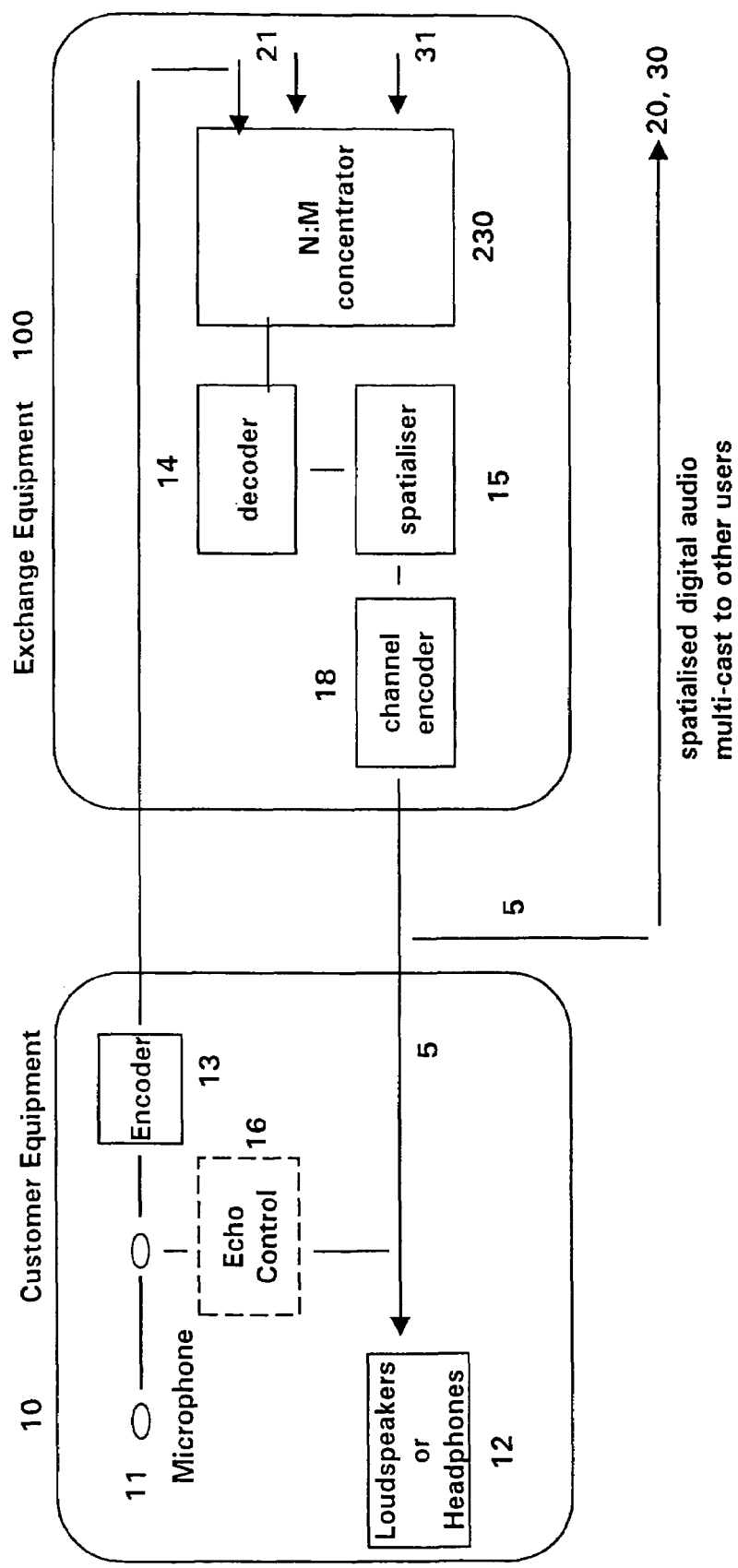
FIG. 5 illustrates a second embodiment of the invention.

FIG. 5 shows an alternative arrangement to that of FIG. 4, in which the spatialisation is computed in the conference 'bridge'. Each conference participant receives the same spatialised signals, thus simplifying the customer equipment. FIG. 5 is similar in general arrangement to FIG. 2, except that the decoder 14 and spatialiser 15 are part of the exchange equipment 200. The output from the spatialiser 15 is passed to an encoder 18 which transmits the required number of audio channels (e.g. two for a stereo system) to each customer 10, 20, 30. This requires the number of channels in the downlink 5 to be equal to the number of audio channels in the spatialisation systems' outputs, instead of the number selected by the concentrator (plus the control channel 4) as in the embodiment of FIG. 2. It also simplifies the customer equipment 10. However, this arrangement requires all customer installations 10, 20, 30 to have similar spatialisation systems, and in particular the same number of audio channels. It would also be more difficult to remove a talker's own voice from the signal he receives. Echo control would also be more complicated, and channel coding may degrade the spatialisation.

Figure 6:
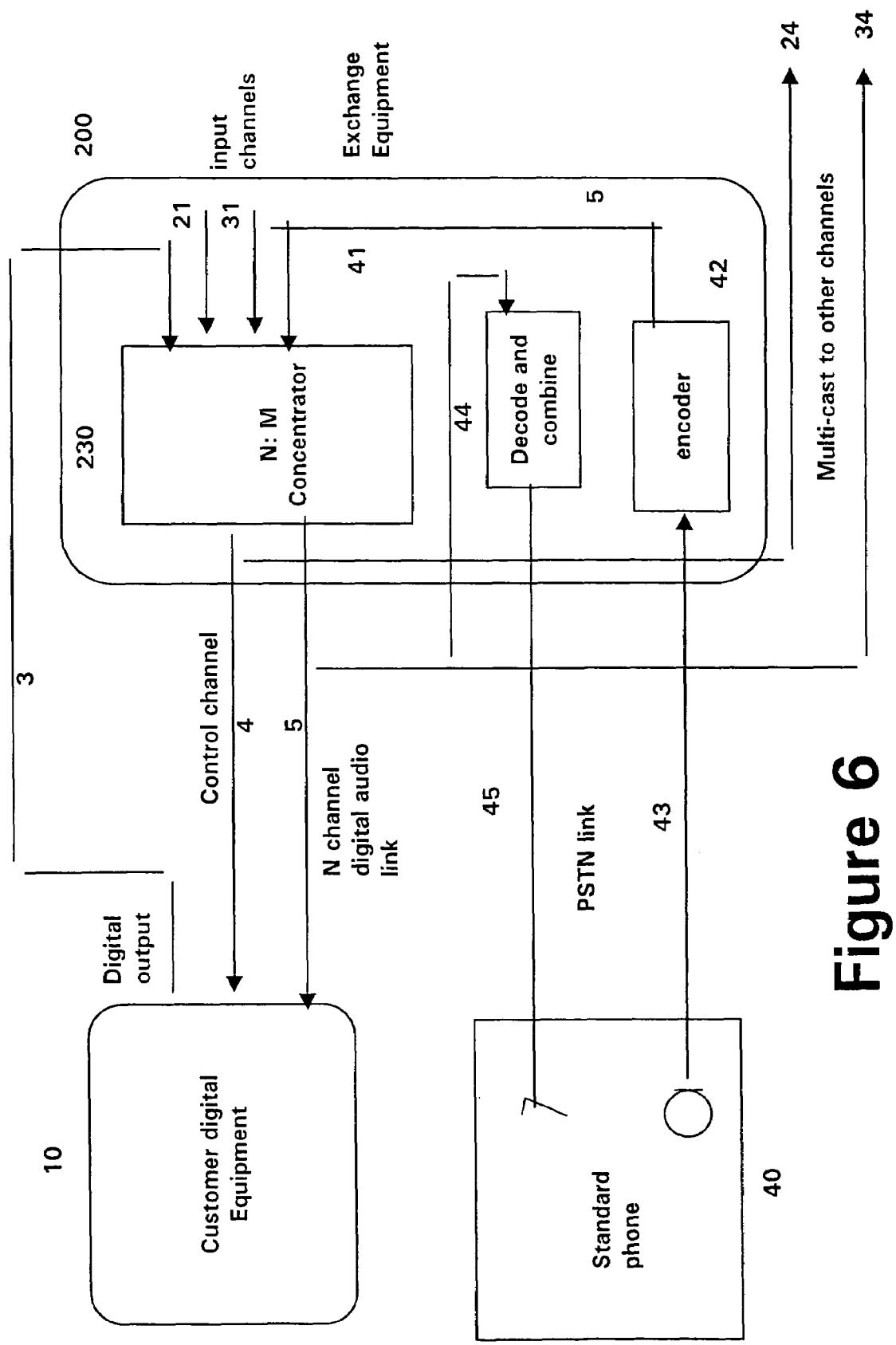
FIG. 6 illustrates how the invention may be used with conventional PSTN channels.

Conventional analogue connections could be included in the conference by providing each analogue connection 43, 45 to the 'bridge' 200 with an encoder 42, as shown in FIG. 6, to provide an input 41 to the concentrator. The output 5 of the concentrator 230 is also decoded and combined in a unit 44 to provide a monaural conference signal 45 to the analogue user 40.

Figure 7:
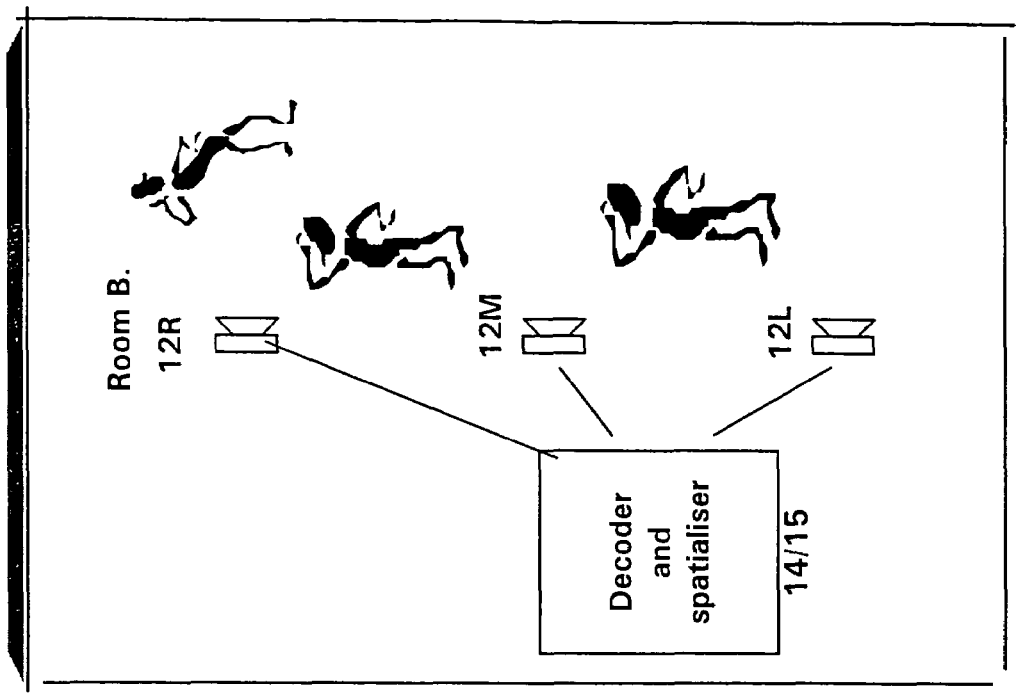
FIG. 7 illustrates a variant of the invention for use with a video conference system.
Figure 7:
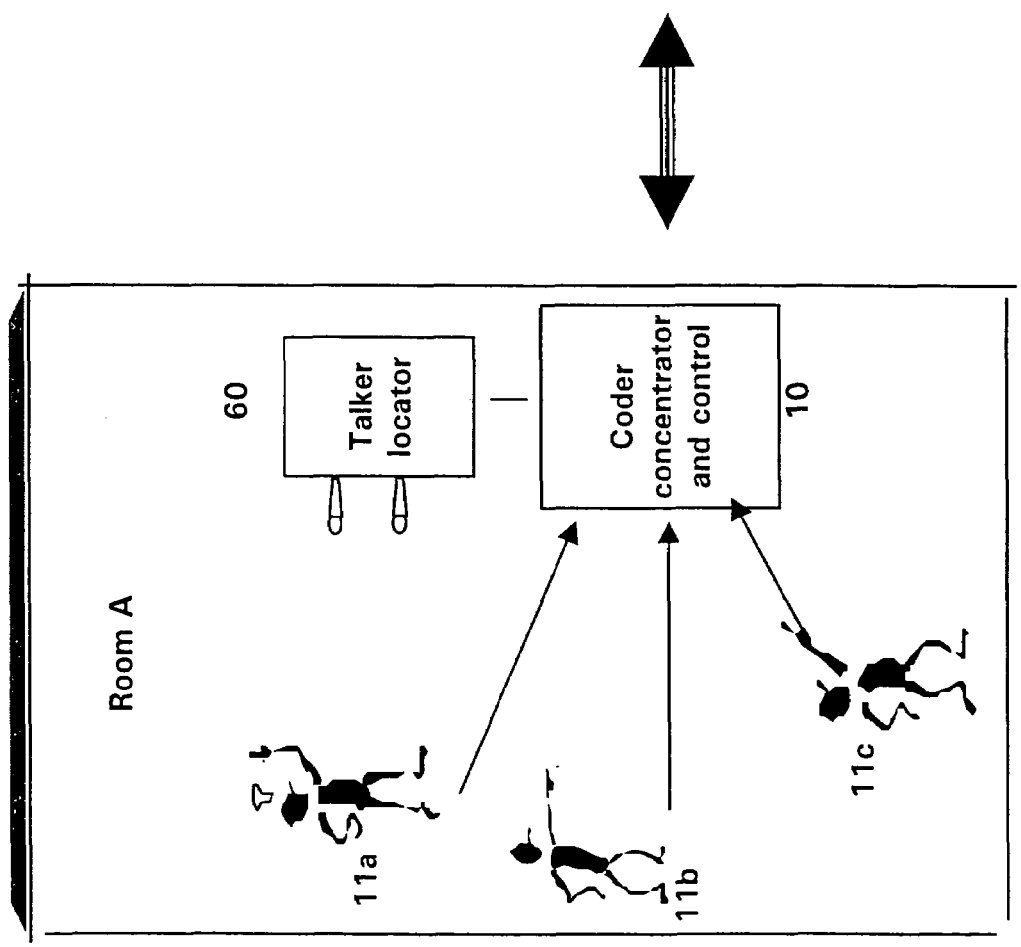

The invention could be applied to a conference situation in which there are several participants at each location, such as the video conference shown in FIG. 7. Close microphones 11a, 11b, 11c, for example of the "tie-clip" type, are used to pick up the sound from each individual talker, and a talker location system 60 is used to keep track of their spatial position. The talker location system 60 may comprise a system of microphones which can identify the positions of sound sources. Relating the position of a sound source to that of the tie clip microphone 11 currently in use makes it possible to learn the position of each talker by audio means alone. Alternatively, the system may detect the position of each user by means such as optical recognition of a badge carried by each user. In either case, the position data detected by the talker location system 60 is passed to the far end (Room B), where correct spatialisation is reconstructed, for output by loudspeakers 12L, 12M, 12R etc. This would achieve a true spatial conference and overcome associated echo control problems, since the "tie clip" microphones 31a, 31b, 31c have a limited range and will not detect the outputs from the loudspeakers in the same room.

Figure 9:
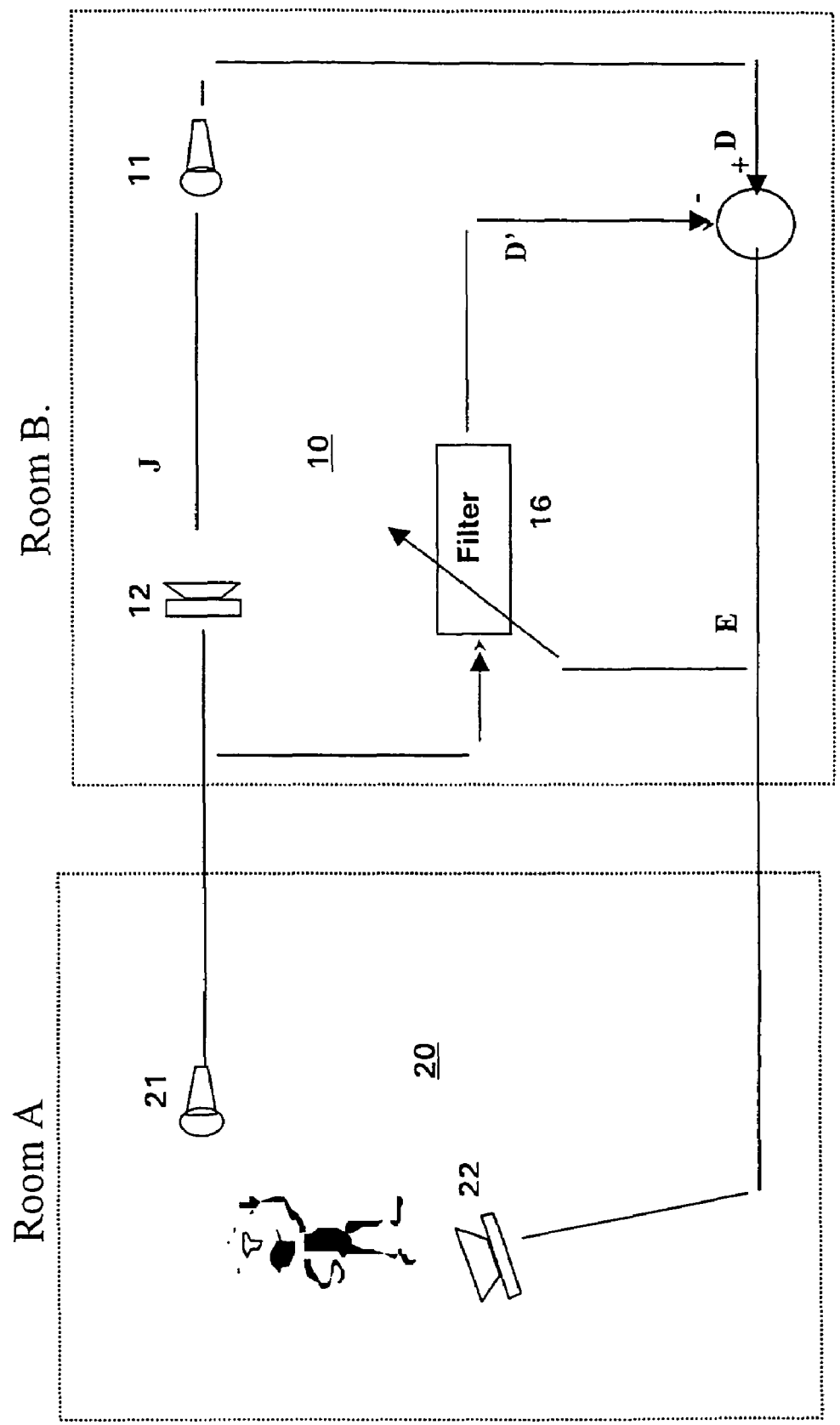
FIGS. 9, 10 and 11 illustrate various echo cancellation techniques.

If loudspeakers are used in the embodiments of FIGS. 2 to 4 or of FIG. 5, there is a need to control acoustic feedback ("echo") between the loudspeaker 12 and the microphone 11. Such feedback causes signals to be retransmitted back into the system, so that each user hears one or more delayed versions of each signal (including his own transmissions) arriving from the other users. For a monophonic system echo control can be done using an echo canceller as shown in FIG. 9. The echo signal, represented by D, is caused by the acoustic path J between the loudspeaker 12 and microphone 11 of equipment 10 in room B. Cancellation is achieved in an echo control unit 16 by using an adaptive filter to create a synthetic model of the signal path J such that the echo D may be removed by subtraction of a cancellation signal D'. The signal returned to equipment 20 in room A is now free of echoes, containing only sounds that originated in Room B. The optimum modelling of the acoustic path J is usually achieved by the adaptive filter in a manner such that some appropriate function of the signal E is driven towards zero. Echo control using adaptive filters in this manner is well known.

Figure 10:
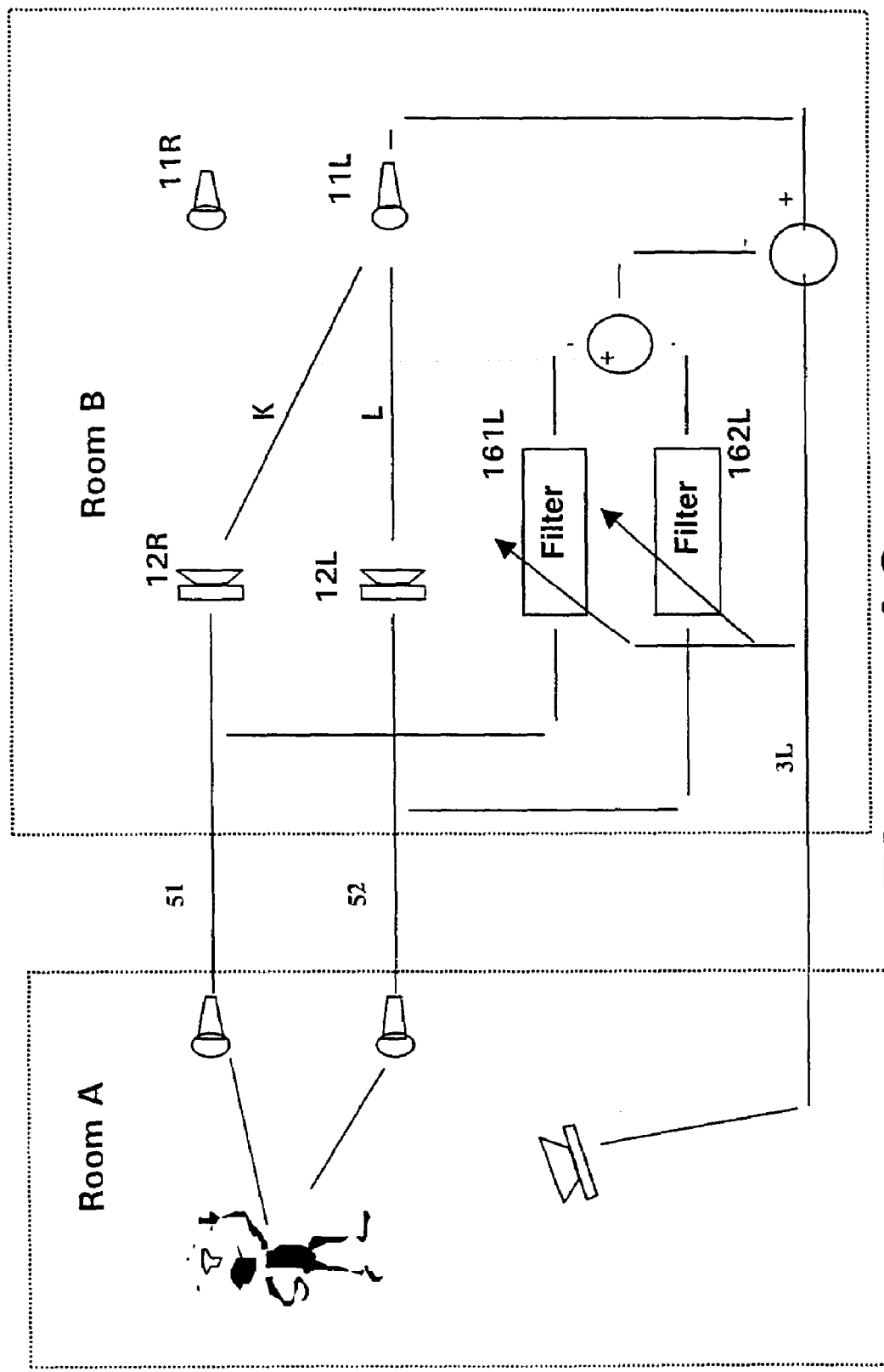

Multi-channel echo cancellation, as shown in FIG. 10 for two channels, is more complex since there are two input channels 51, 52 and therefore two loudspeakers 12L, 12R. It is therefore necessary to model two echo paths K and L for each of the two return channels 3L, 3R. (The process is only shown for return channel 3L, using microphone 11L). Correct echo cancellation is only achieved if adaptive filters 161L, 162L model the signal paths K and L respectively. (Two further filters 161R, 162R are required for the other return channel 3R) However, it is not possible to find a correct model for each path K, L independently without some difficult and expensive signal processing as described in "A better understanding and an improved solution to the specific problems of stereophonic echo cancellation" (IEEE Transactions on speech and Audio processing, Vol 6, no 2 Mar. 1998. Authors: J Benesty, D R Morgan and M M Sondhi).

Figure 11:
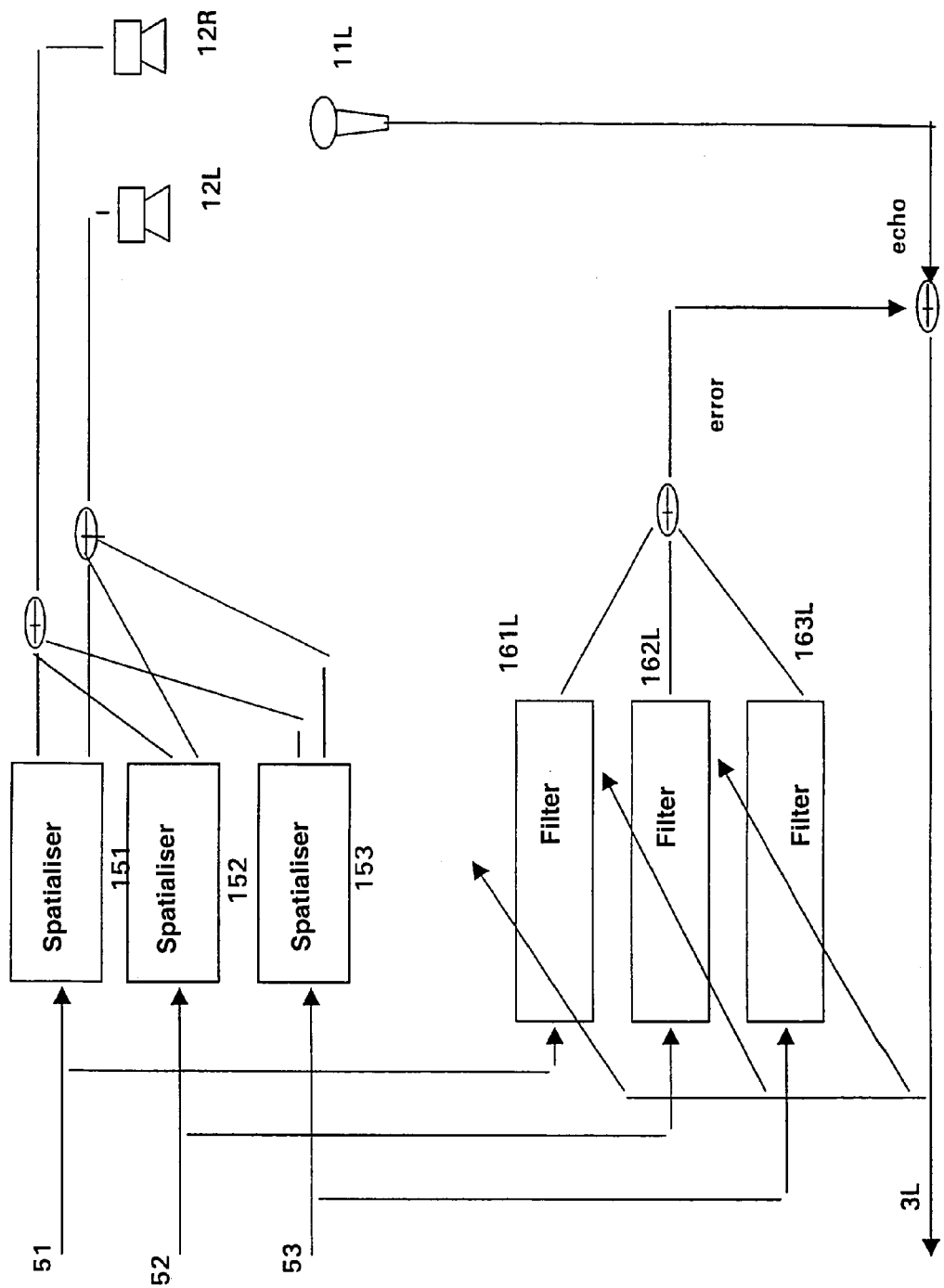

The system described above with reference to FIG. 4 employs linear artificial spatialisation techniques. FIG. 11 shows how this, and the fact that the echo from each loudspeaker 12L, 12R combines linearly at each microphone 11L, (11R, not shown), allows echo cancellation to be provided for each output channel 3L, (3R) by having a separate adaptive filter 161L, 162L, 163L, (161R, 162R, 163R) on each input channel 51, 52, 53. Thus the adaptive filter 161L will model the combination of the spatialiser 151 for the channel 51, and the echo path between the loudspeakers 12L and 12R and the microphone 11L. This arrangement is discussed in detail in the applicant's co-pending application claiming the same priority as the present case.

What is claimed is:

1. A teleconferencing system comprising a conference bridge having a multichannel audio connection to each of a plurality of terminal equipments, each multichannel audio connection comprising a plurality of individual audio channels, and each of the terminal equipments receiving the individual audio channels through a respective one of the multichannel audio connections, each of the terminal equipments having means to separately process each received audio channel to provide a plurality of outputs, each output representing one of the other terminal equipments;

wherein the conference bridge comprises a concentrator, having means to identify the currently active input channels, and to transmit only those active channels over the multichannel audio connections as the plurality of individual audio channels, together with control information identifying the transmitted channels.

2. A system as in claim 1, wherein the currently active input audio channels form a subset of input audio channels of the conference bridge.

3. A system according to claim 1, wherein at least one of the terminal equipments has spatializer to combine the outputs representing each terminal equipment to provide a spatialized audio in which each terminal equipment is represented by a virtual sound source.

4. A system as in claim 1, wherein each of the terminal equipments includes a demultiplexer for separating the individual audio channels received through a respective one of the multichannel audio connections.

5. A method of providing teleconferencing services to a plurality of terminal equipments, in which a multichannel audio connection is provided from a conference bridge to each of the plurality of terminal equipments, each multichannel audio connection comprising a plurality of individual audio channels, in which each of the plurality of terminal equipments receives individual audio channels through a respective one of the multichannel audio connections, and processes each received individual audio channel separately to provide a plurality of outputs, such output each representing a respective one of the other terminal equipments;

wherein the conference bridge identifies the currently active input channels and transmits only those active channels over the multichannel audio connections as the plurality of individual audio channels, together with control information identifying the transmitted channels.

6. A method as in claim 5, wherein the currently active input audio channels form a subset of input audio channels of the conference bridge.

7. A method according to claim 5, wherein the outputs are processed to generate a spatialized audio output in which at least one of the terminal equipments is represented by a virtual sound source.

8. A method as in claim 5, wherein each of the terminal equipments includes a demultiplexer for separating the individual audio channels received through a respective one of the multichannel audio connections.

* * * * *